United States Patent [19]

Kessell

[11] 3,831,601

[45] Aug. 27, 1974

[54] ADJUSTABLE SYRINGE PLUNGER

[75] Inventor: Archie Kessell, Huntington Beach, Calif.

[73] Assignee: Rohe Scientific Corporation, Santa Ana, Calif.

[22] Filed: Oct. 29, 1973

[21] Appl. No.: 410,385

[52] U.S. Cl............... 128/218 PA, 128/219, 215/54
[51] Int. Cl............................................ A61m 5/22
[58] Field of Search.. 128/215, 218 P, 219, 218 PA, 128/218 C, 218 R, 218 D, 272, 234–238, 261, 218 M; 222/386.5; 215/54

[56] References Cited
UNITED STATES PATENTS

| | | | |
|---|---|---|---|
| 577,682 | 2/1897 | Eissner............................. | 128/234 |
| 1,718,474 | 6/1929 | McQuaid......................... | 128/218 P |
| 2,895,773 | 7/1959 | McConnaughey............... | 128/219 X |
| 3,353,718 | 11/1967 | McLay............................ | 128/218 C |
| 3,742,949 | 7/1973 | Hill................................. | 128/218 P |
| 3,747,479 | 7/1973 | Nightingale et al............. | 128/219 |

FOREIGN PATENTS OR APPLICATIONS

| | | | |
|---|---|---|---|
| 1,210 | 1/1897 | Great Britain.................. | 128/234 |

Primary Examiner—Richard A. Gaudet
Assistant Examiner—J. C. McGowan
Attorney, Agent, or Firm—Harris, Kern, Wallen & Tinsley

[57] ABSTRACT

An adjustable syringe plunger of Teflon and of a size to fit into the cylinder of the syringe and having forward and rearward ends, the plunger being axially tapered externally thereof toward its forward and rearward ends from an annulus adjacent its forward end. The plunger has a threaded axial, cylindrical bore therein extending from its rearward end toward its forward end and terminating in an inner end just rearwardly of the annulus, the plunger having a threaded tapered bore forming an axial continuation of the cylindrical bore and converging from the inner end of the cylindrical bore to adjacent the forward end of the plunger. A stem is threaded through the cylindrical bore and into the tapered bore to expand the plunger in its cylinder, thereby providing a relatively wide band of engagement between the plunger and the cylinder in the area of the annular intersection of the two external axial tapers.

6 Claims, 3 Drawing Figures

PATENTED AUG 27 1974  3,831,601

ADJUSTABLE SYRINGE PLUNGER

BACKGROUND OF INVENTION

The present invention relates in general to syringes, such as hypodermic syringes, syringes used for metering purposes in laboratory equipment, and the like.

More particularly, the present invention relates to syringes having expansible plungers, usually made of an elastomeric material, which can be expanded to provide the desired fluid tight fit between the plunger and its cylinder. Expansible plunger syringes of the type to which the present invention relates generally include an elastomeric plunger having a tapped axial bore into which a slightly larger stem is threaded to expand the plunger into engagement with the interior wall of the cylinder.

Prior patents known to me which relate to expansible plunger syringes include:

| | |
|---|---|
| Eisenstark | 2,574,964 |
| Nelson | 2,575,425 |
| Pontius | 2,660,168 |
| Jorgensen | 2,668,535 |
| Ogle | 2,693,803 |
| McConnaughey | 2,895,773 |
| Hein | Re. 17,059 |

The invention further contemplates an expansible plunger which is made of Teflon, this material having numerous advantages, among which are its inertness to most gases and liquids, its self lubricating qualities, and the like. However, conventional Teflon plungers have one serious disadvantage, viz., they are notorious for short service lives because the Teflon moves away from the pressure sealing annulus by cold flow. The ultimate result is leakage between the plunger and its cylinder.

OBJECTS AND SUMMARY OF INVENTION

With the foregoing background in mind, the primary object of the present invention is to provide a Teflon-plunger syringe which overcomes the problem of cold flow of the Teflon away from the pressure sealing annulus while retaining all of the advantages characteristic of this material.

More particularly, the invention may be summarized as including, and an important object of the invention is to provide a syringe plunger and stem combination which includes: an expansible Teflon plunger having forward and rearward ends and being axially tapered externally thereof toward its forward and rearward ends from an annulus adjacent its forward end, such annulus being in fluid tight engagement with the inner wall of the cylinder of the syringe; a threaded cylindrical axial bore in the plunger extending from its rearward end toward its forward end and terminating in an inner end adjacent the annulus; a threaded tapered bore in the plunger forming an axial continuation of the cylindrical bore and converging from the inner end of the cylindrical bore to adjacent the forward end of the plunger; and a stem having a threaded end threadedly insertable through the cylindrical bore into the tapered bore.

With the foregoing construction, if the Teflon of which the plunger is made moves, by cold flow, away from the annular sealing area at the junction of the two external tapers, the situation can be corrected very readily simply by turning the stem sufficiently to restore the necessary pressural engagement between the annulus and the cylinder. (It is important to note that the initial fit between the plunger and the cylinder is sufficiently tight that the stem can be rotated relative to the plunger, to expand the plunger, without rotation of the plunger in the cylinder.)

The foregoing adjustment of the plunger can be made periodically when such adjustment is determined to be necessary by observation. Alternatively, the cold flow rate of the Teflon can be determined empirically, and the necessary adjustment can be made at regular time intervals. For example, the syringes of automatic laboratory equipment can be scheduled for adjustment of the Teflon plungers of the syringes incorporated therein on a weekly basis, by turning each stem one-quarter of a turn, for example.

Another object of the invention is to provide a plunger wherein the junction of the cylindrical and tapered, threaded bores is between the annular junction of the external tapers and the rearward end of the plunger, and in close proximity to such annular junction.

Yet another object is to provide a syringe plunger wherein the cylindrical bore is of the order of about two and one-half times as long as the tapered bore.

Still another object is to provide a plunger wherein the length of the portion of the plunger forwardly of the annular junction of the two external tapers is as small as possible to minimize the effect of the forward external taper on the accuracy of volumetric displacement. In other words, the forward portion of the plunger should be just long enough to accommodate the portion of the tapered threaded bore which extends forwardly of the annular junction of the two external tapers.

The foregoing objects, advantages, features and results of the present invention, together with various other objects, features, advantages and results which will be evident to those skilled in the syringe art in the light of this disclosure, may be achieved with the exemplary embodiment of the invention illustrated in the accompanying drawing and described in detail hereinafter.

DESCRIPTION OF EXEMPLARY EMBODIMENT OF INVENTION

Figure 1:
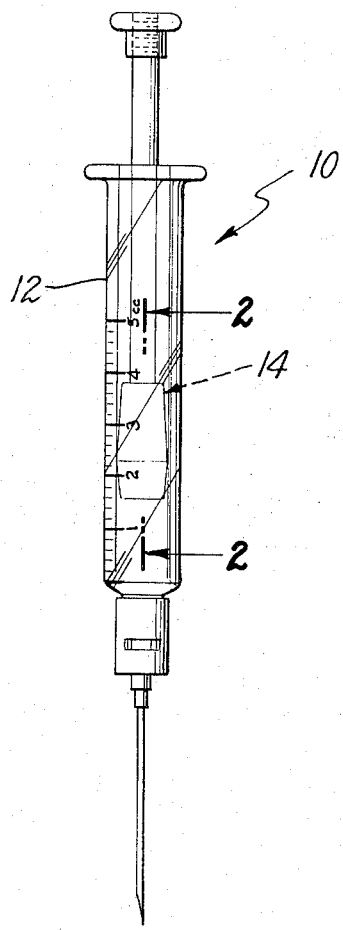
FIG. 1 is an elevational view of the syringe of the invention as incorporated in a hypodermic syringe, it being understood that this embodiment is purely illustrative.

The syringe embodying the invention is designated generally by the numeral 10 and includes the conventional cylinder or barrel 12, which may be formed of glass and provided with the customary graduations.

Reciprocable in the cylinder 12 is a Teflon plunger 14 having axially spaced forward and rearward ends 16 and 18. The plunger 14 is provided with external axial tapers 20 and 22 respectively extending forwardly and rearwardly from an annular junction or annulus 24 which is considerably closer to the forward end 16 than the rearward end 18. The forward and rearward tapers 20 and 22 respectively extend from the annular junction 24 to the forward and rearward ends 16 and 18. The angles of the tapers 20 and 22 are shown as 3°, but may be varied from this value. Preferably, the length of the forward tapered portion 20 is kept as small as possible to minimize the effect of the taper thereof on the accuracy of volumetric displacement.

Figure 2:
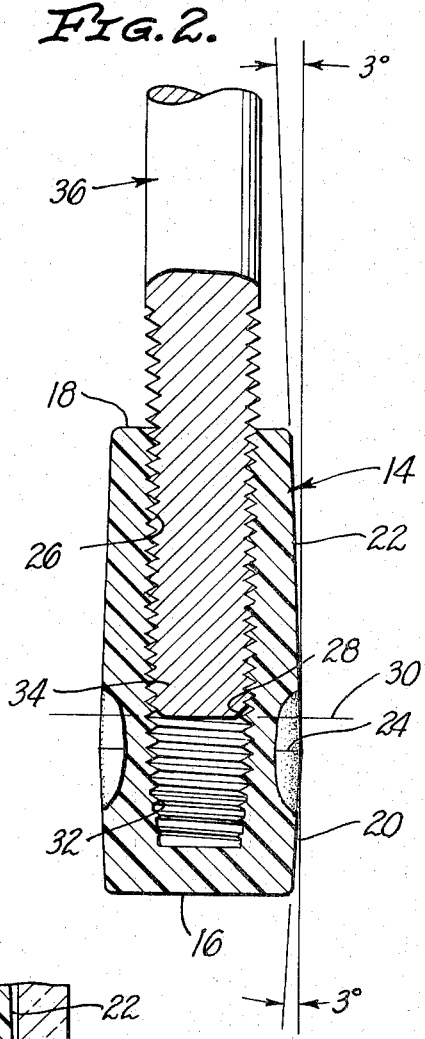
FIG. 2 is an enlarged view, partially in elevation and partially in longitudinal section, showing the plunger stem combination of the invention.

Extending axially inwardly from the rearward end 18 of the plunger 14 is a cylindrical threaded bore 26 terminating in an inner end 28 the position of which is represented by the transverse line 30 in FIG. 2. It will be noted that the inner end 20 of the cylindrical threaded bore 26 is located just aft of the annular junction 24 of the external tapers 20 and 22.

The cylindrical threaded bore 26 continues toward the forward end 16 of the plunger 14 as a tapered threaded bore 32, the length of the tapered forward portion 20 being just sufficient to accommodate the tapered threaded bore 32.

Figure 3:
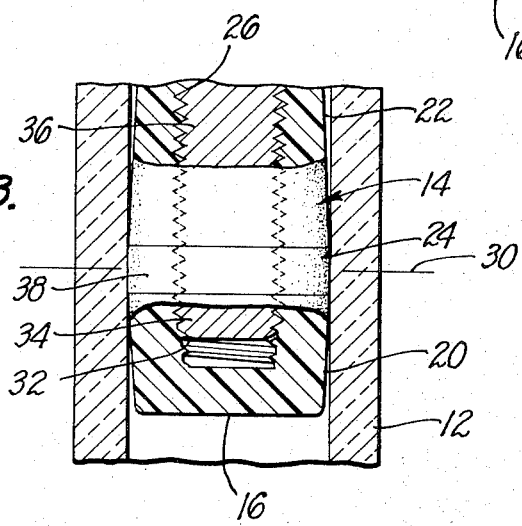
FIG. 3 is a view duplicating a portion of FIG. 2, but showing the plunger expanded, and showing it in the cylinder of the syringe.

Threaded into the cylindrical threaded bore 26, as shown in FIG. 2, and threadable forwardly into the tapered threaded bore 32, as shown in FIG. 3, is a threaded forward end 34 of a stem 36 which projects rearwardly from the cylinder 12. The threads on the stem portion 34 are preferably of the same size and pitch as the threads in the cylindrical bore 26.

As an example, in a 2cc syringe, wherein the maximum plunger diameter is of the order of 0.35 inch, the forward stem portion 34 may be provided with number 10–32 threads and the cylindrical and tapered threaded bores 26 and 32 may be formed with a number 10–32 taper tap. Obviously, other thread sizes may be used for other syringe and plunger sizes.

The initial maximum diameter of the plunger 14 is slightly larger than the inside diameter of the cylinder 12 so that the plunger is radially compressed in the region of the annular junction 24 to provide an annular engagement band between the plunger and the cylinder. The width of this annular engagement band may be increased by screwing the threaded stem portion 34 into the tapered threaded bore 32 to insure a fluid tight seal, such a wider annular engagement band being designated by the numeral 38 in FIG. 3 of the drawing. The initial annular engagement band resulting from insertion of the plunger 14 into the cylinder 12 prevents rotation of the plunger as the stem 36 is threaded farther into the cylindrical threaded bore 26 and into the tapered threaded bore 32.

It will be noted from FIGS. 2 and 3 that the runout of the tapered thread 32, which is formed by a tapered tap, is imperfect, thus causing the desired expansion.

It is thought that the operation of the invention will be clear from the discussion hereinbefore presented. Briefly, if, as the result of cold flow of the Teflon of the plunger 14, the effectiveness of the fluid tight seal between the plunger and the cylinder 12 decreases below a desired minimum, the sealing effectiveness may be restored very easily by rotating the stem 36 to the required extent.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In a syringe having a tubular cylinder, the structure comprising:
  a. an expansible plunger positioned in and against the cylinder and having forward and rearward ends;
  b. said plunger being axially tapered externally thereof toward its forward and rearward ends from an annulus adjacent its forward end;
  c. said plunger having a threaded axial bore therein extending from its rearward end toward its forward end and terminating in an inner end adjacent said annulus;
  d. said plunger having a threaded tapered bore forming an axial continuation of the bore first mentioned and converging from said inner end of said first-mentioned bore to adjacent said forward end of said plunger; and
  e. a stem having a threaded end threaded into said first-mentioned bore and threadable into said tapered bore.

2. The syringe structure defined in claim 1 wherein said first-mentioned bore is cylindrical.

3. The syringe structure set forth in claim 2 wherein the junction of said cylindrical and tapered bores is between said annulus and said rearward end of said plunger.

4. The syringe structure defined in claim 3 wherein said cylindrical bore is longer than said tapered bore.

5. The syringe structure defined in claim 3 wherein said cylindrical bore is about two and one-half times as long as said tapered bore.

6. The syringe structure set forth in claim 1 wherein said plunger is formed of Teflon.

* * * * *